(12) United States Patent
Park et al.

(10) Patent No.: US 7,755,565 B2
(45) Date of Patent: Jul. 13, 2010

(54) DUAL TYPE FLAT PANEL DISPLAY DEVICE

(75) Inventors: Dong-Jin Park, Dalseo-gu (KR);
Tae-Hyeog Jung, Yangsan-si (KR);
Hae-Jin Heo, Ulsangwangyeok-si (KR);
Byung-Seon An, Busan (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 1040 days.

(21) Appl. No.: 10/924,911

(22) Filed: Aug. 25, 2004

(65) Prior Publication Data

US 2005/0174299 A1 Aug. 11, 2005

(30) Foreign Application Priority Data

Feb. 9, 2004 (KR) ................ 10-2004-0008500

(51) Int. Cl.
*G09G 5/00* (2006.01)
(52) U.S. Cl. ..................................... 345/1.1
(58) Field of Classification Search ............ 345/1.1, 345/1.3, 103
See application file for complete search history.

(56) References Cited

U.S. PATENT DOCUMENTS

| | | | |
|---|---|---|---|
| 6,396,469 B1 * | 5/2002 | Miwa et al. ............ | 345/87 |
| 7,268,746 B2 * | 9/2007 | Yoshida ................ | 345/1.1 |
| 2003/0063041 A1 * | 4/2003 | Kurashima et al. ..... | 345/1.1 |
| 2004/0169618 A1 * | 9/2004 | Nakai et al. ........... | 345/1.1 |
| 2005/0030254 A1 * | 2/2005 | Jung et al. ............ | 345/1.1 |
| 2005/0057477 A1 * | 3/2005 | Yun et al. ............. | 345/93 |

FOREIGN PATENT DOCUMENTS

| | | |
|---|---|---|
| CN | 1437183 | 8/2003 |
| EP | 1 406 240 | 4/2004 |
| JP | 06-018846 | 1/1994 |
| JP | 10-186396 | 7/1998 |
| JP | 11-17446 | 7/1999 |
| JP | 11-174486 | 7/1999 |

(Continued)

OTHER PUBLICATIONS

Office Action issued on Feb. 9, 2007 by the Chinese Intellectual Property Office for Chinese Patent Application No. 20041008279.X.

(Continued)

*Primary Examiner*—Chanh Nguyen
*Assistant Examiner*—Allison Walthall
(74) *Attorney, Agent, or Firm*—Stein McEwen, LLP

(57) ABSTRACT

A dual type flat panel display device including a first flat panel display device panel; and a second flat panel display device panel; wherein the first and second flat panel display device panels each include a pixel area including a plurality of scan lines arranged in a first direction, a plurality of data lines arranged in a second direction perpendicular to the first direction, and pixel electrodes disposed in an area formed by the plurality of data lines and the plurality of scan lines crossing the data lines; and a non-pixel area including a plurality of on/off switching devices at inputs of the scan lines or the data lines, wherein the switching devices are respectively connected to the plurality of scan lines or the plurality of data lines.

35 Claims, 4 Drawing Sheets

FOREIGN PATENT DOCUMENTS

| | | |
|---|---|---|
| JP | 2001-67049 | 3/2001 |
| JP | 2001-356744 | 12/2001 |
| JP | 2003-323164 | 11/2003 |
| JP | 2004-126257 | 4/2004 |
| JP | 2005-055467 | 3/2005 |
| JP | 2005-156574 | 6/2005 |
| KR | 2001-974 | 1/2001 |
| KR | 2003-37126 | 5/2003 |
| WO | WO 2004/061806 | 7/2004 |

OTHER PUBLICATIONS

Search Report issued in European Application No. 04090358.5 on Jun. 23, 2008.

* cited by examiner

DUAL TYPE FLAT PANEL DISPLAY DEVICE

CROSS-REFERENCE TO RELATED APPLICATIONS

This application claims the benefit of Korean Patent Application No. 2004-8500, filed Feb. 9, 2004, in the Korean Intellectual Property Office, the disclosure of which is hereby incorporated herein by reference.

BACKGROUND OF THE INVENTION

1. Field of the Invention

The present invention relates to a dual type flat panel display device, and, more particularly, to a dual type flat panel display device with reduced wiring.

2. Description of the Related Art

Recently, as devices such as notebook computers, televisions, or the like become lighter and thinner, display devices for these respective devices are also required to be light and thin. According to this requirement, a flat panel type display device, such as a liquid crystal display device (LCD), has been developed which will substitute for a cathode ray tube (CRT).

Further, with the increasing popularity of mobile phones, the liquid crystal display device, which may be used as a small display device for the mobile phones, is being widely used. Typically, a folder type mobile phone allows a user to confirm display information indicating operation states of the mobile phone. For example, an antenna icon (indicating the intensity of received electric field), a current time, a coverage deviation state, a battery indicator state, a various functions setting state, or the like, may be displayed only when the folder of the folder type mobile phone is opened.

Therefore, in the conventional folder type mobile phones, there is an inconvenience in that the liquid crystal display device for the mobile phone only allows operation state information to be confirmed after the folder of the mobile phone is opened.

Accordingly, a dual folder type mobile phone has been developed. It comprises both an internal window and an external window, enabling display information to be easily confirmed in the state where a folder of the phone is closed.

Thus, a dual type LCD display device with a dual LCD panel has been widely adopted as display windows for the dual folder type mobile phone.

FIG. 1 is a block diagram of a configuration driving a conventional dual type LCD panel, and FIG. 2A is a plan view illustrating a wiring status of the conventional dual type LCD display device.

Referring to FIGS. 1 and 2, the conventional dual type LCD display device includes an LCD gate driver 30 and an LCD data driver 40. The LCD gate driver 30 comprises a first LCD gate driver 31 and a second LCD gate driver 32 to drive a first LCD panel 100 and a second LCD panel 200, respectively. The data driver 40 comprises a first LCD data driver 41 and a second LCD data driver 42 corresponding to the first LCD panel 100 and the second LCD panel 200, respectively.

In order to drive the LCD gate driver 30, a voltage from a control unit 10 is applied to a driving voltage generating unit 20, and a voltage signal from the driving voltage generating unit 20 is applied to the LCD gate driver 30. At the same time, a gate driving voltage is received from the control unit 10, and thus a gate signal is applied to scan lines.

At this time, in order to drive the first LCD panel 100, the first LCD gate driver 31 maintains a Von state while the second LCD gate driver 32 maintains a Voff state. In this case the control unit 10 applies a data signal only to the first LCD data driver 41 to drive the first LCD panel 100.

Similarly, in order to drive the second LCD panel 200, the driving voltage generating unit 20 allows a gate driving voltage of the first LCD gate driver 31 to be maintained in a Voff state, and a gate driving voltage of the second LCD gate driver 32 to be maintained in a Von state. A data signal is applied only to the second LCD data driver 42 in the LCD data driver 40 to drive the second LCD 200.

Conventionally, if the LCD gate and data drivers 30 and 40 comprise the second LCD gate driver 32, it is not necessary for the dual type LCD panel to also comprise the second LCD data driver 42. Similarly, if the LCD gate and data drivers 30 and 40 comprise the second LCD data driver 42, it is not necessary for the dual type LCD panel to also comprise the LCD gate driver 32. That is, the LCD gate and data drivers 30 and 40 may comprise only one of the second LCD gate driver 32 and the second LCD data driver 42.

However, the conventional art has a disadvantage in that, since a need exists for wirings LSn+1 through LS2n and LDn+1 through LD2n extending from the second LCD gate driver 32 and the second LCD data driver 42, respectively, to the second LCD panel 200, as well as wirings LS1 through LSn and LD1 through LDn extending from the first LCD gate driver 31 and the first LCD data driver 41, respectively, to the first LCD panel 100, as shown in FIG. 2, there exists a margin, namely, a dead space where the wiring for the second LCD panel 200 is disposed, which increases the size of the dual type LCD display device.

Further, there is a problem in that, since the second LCD gate driver 32 and/or the second LCD data driver 42 are necessary in the conventional art, the manufacturing cost increases.

Korean Laid-Open Patent Nos. 2001-974 and 2003-37126 describe a folder type mobile phone with a dual LCD panel. In these references, a dual type LCD composed of first and second LCDs is used for internal and external windows of the mobile phone, and comprises one LCD driving unit or two driving units for driving the first and second LCDs.

In this case, however, there still is a problem in that, since the control of the first and second LCDs is performed by an LCD driving unit, there is a dead space where the wiring from the LCD driving unit to the second LCD is disposed.

SUMMARY OF THE INVENTION

An aspect of the present invention is to provide a dual type flat panel display device which can be compactly manufactured by designing a gate and/or data signal source into one chip without increasing a dead space in fabricating the display device, and which can reduce manufacturing cost because of its simple configuration.

Additional aspects and/or advantages of the invention will be set forth in part in the description which follows and, in part, will be obvious from the description, or may be learned by practice of the invention.

According to one aspect of the present invention, there is provided a dual type flat panel display device comprising: a first flat panel display device panel; and a second flat panel display device panel; wherein the first and second flat panel display device panels each include: a pixel area including a plurality of scan lines arranged in a first direction, a plurality of data lines arranged in a second direction perpendicular to the first direction, and pixel electrodes disposed in an area formed by the plurality of data lines and the plurality of scan lines crossing the data lines; and a non-pixel area including a plurality of on/off switching devices at inputs of the scan lines or the data lines, wherein the switching devices are respectively connected to the plurality of scan lines or the plurality of data lines.

Further, according to another aspect of the present invention, there is provided a dual type flat panel display device comprising: first and second flat panel display device panels including a plurality of scan lines, a plurality of data lines, and a plurality of pixel electrodes; a gate driver to output a gate driving signal and a gate driving voltage to the plurality of scan lines; a data driver to output a driving voltage to the plurality of data lines according to a received data driver driving signal; a control unit to generate the data driver driving signal and the gate driving signal; a driving voltage generating unit to receive the gate driving signal from the control unit and output the gate driving voltage to the gate driver; and on/off switching devices respectively connected to either the plurality of scan lines or the plurality of data lines.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
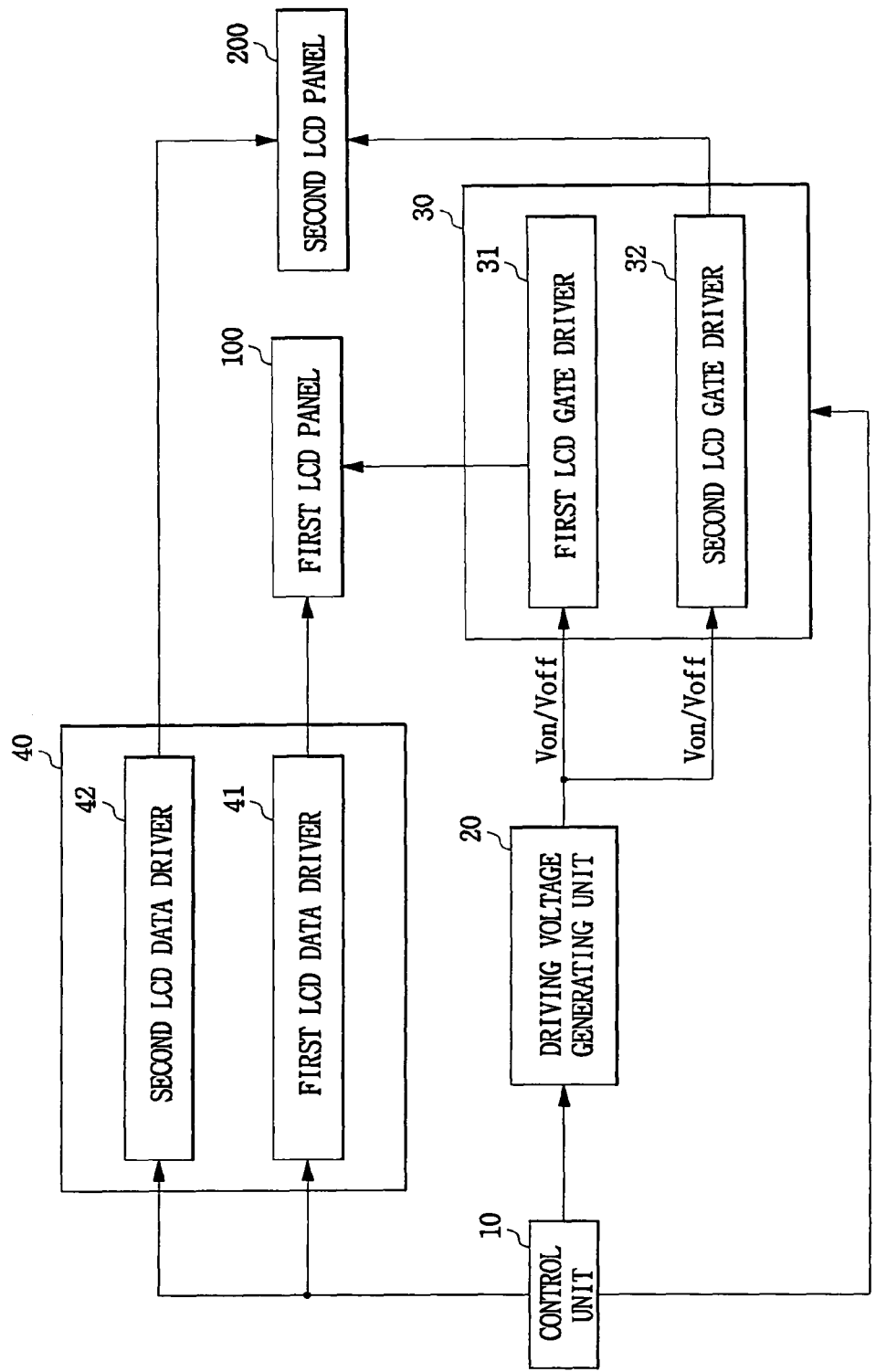
FIG. 1 is a block diagram of a configuration driving a conventional dual type LCD panel.

Reference will now be made in detail to the embodiments of the present invention, examples of which are illustrated in the accompanying drawings, wherein like reference numerals refer to the like elements throughout. The embodiments are described below to explain the present invention by referring to the figures. In the drawings, the thickness of layers and regions are exaggerated for clarity.

The present invention relates to a dual flat panel display device which includes a first flat panel display device panel and a second flat panel display device panel. In the following embodiments of the present invention, these flat panel display device panels are LCD panels, but the present invention is not limited to such. For example, organic electroluminescence display panels, as well as other types of display panels may be used.

Figure 3:
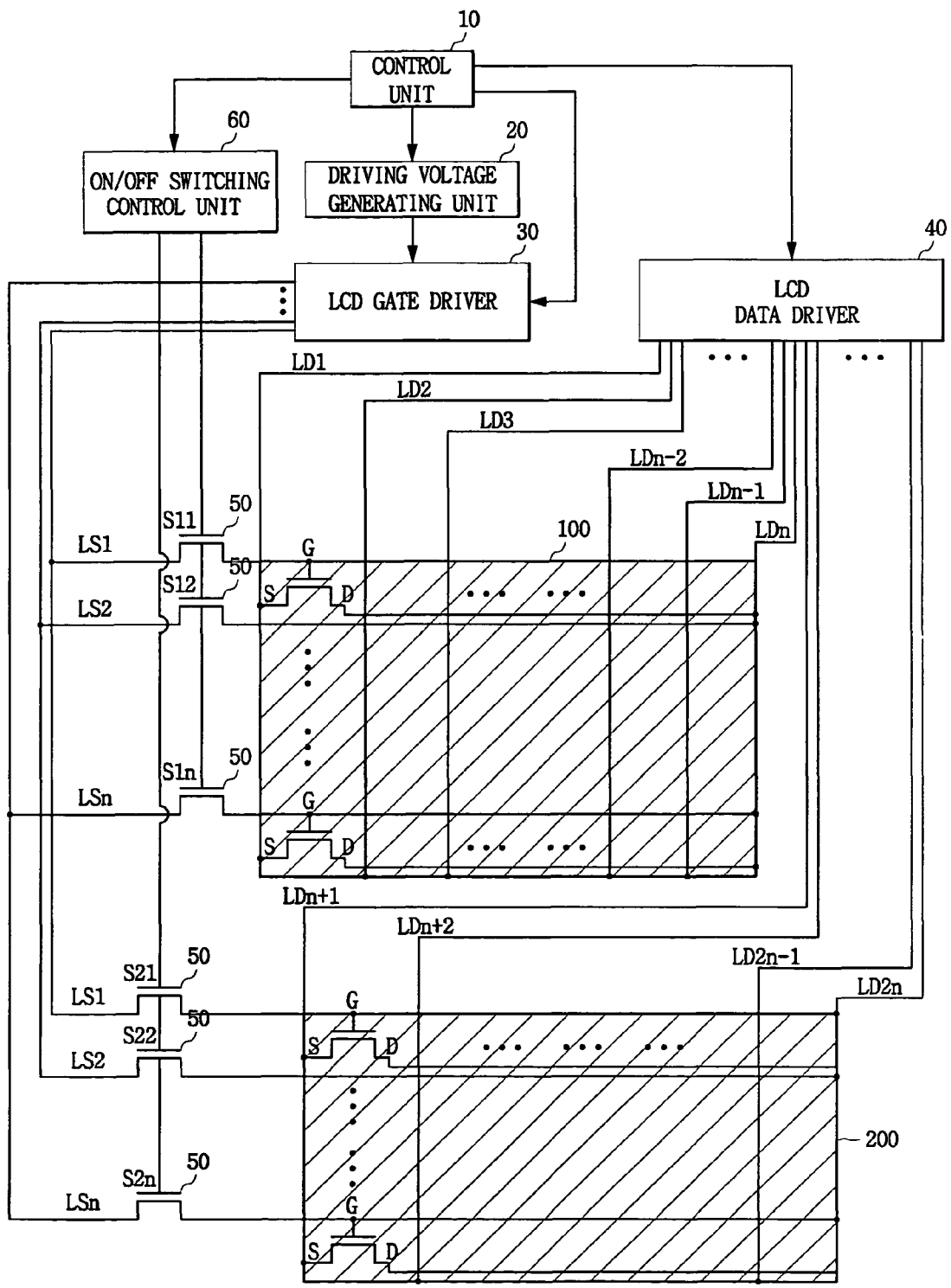
FIG. 3 is a plan view illustrating a wiring status of a dual type LCD display device according to an embodiment of the present invention.

FIG. 3 is a plan view illustrating a wiring status of a dual type LCD display device according to an embodiment of the present invention.

Referring to FIG. 3, a dual type LCD display device according to an embodiment of the present invention includes a first LCD panel 100 and a second LCD panel 200.

The first LCD panel 100 and the second LCD panel 200 include a plurality of scan lines LS1, LS2, . . . , LSn arranged in a first direction. The first LCD panel 100 also includes a plurality of data lines LD1, LD2, . . . , LDn−1, LDn arranged in a second direction perpendicular to the first direction, and the second LCD panel 200 also includes a plurality of data lines LDn+1, LDn+2, . . . , LD2n−1, LD2n arranged in the second direction perpendicular to the first direction.

The first LCD panel 100 and the second LCD panel 200 each include a pixel area, including pixel electrodes formed in the pixel area, which is formed by the plurality of data lines LD1, LD2, . . . ,LDn−1, LDn, and LDn+1, LDn+2, . . . , LD2n−1 and LD2n, respectively, and the plurality of scan lines LS1, LS2, . . . , LSn crossing the data lines.

Further, a plurality of on/off switching devices S11, S12, . . . , S1n and S21, S22, . . . , S2n (identified collectively by the number 50 in FIG. 3), respectively connected to the plurality of scan lines, are included in inputs of the scan lines LS1, LS2, . . . , LSn of the first LCD panel 100 and the second LCD panel 200.

Further, the plurality scan lines LS1, LS2, . . . , LSn of the first LCD panel 100 and the plurality scan lines LS1, LS2, . . . ,LSn of the second LCD panel 200 are respectively interconnected by common wirings.

Figure 2:
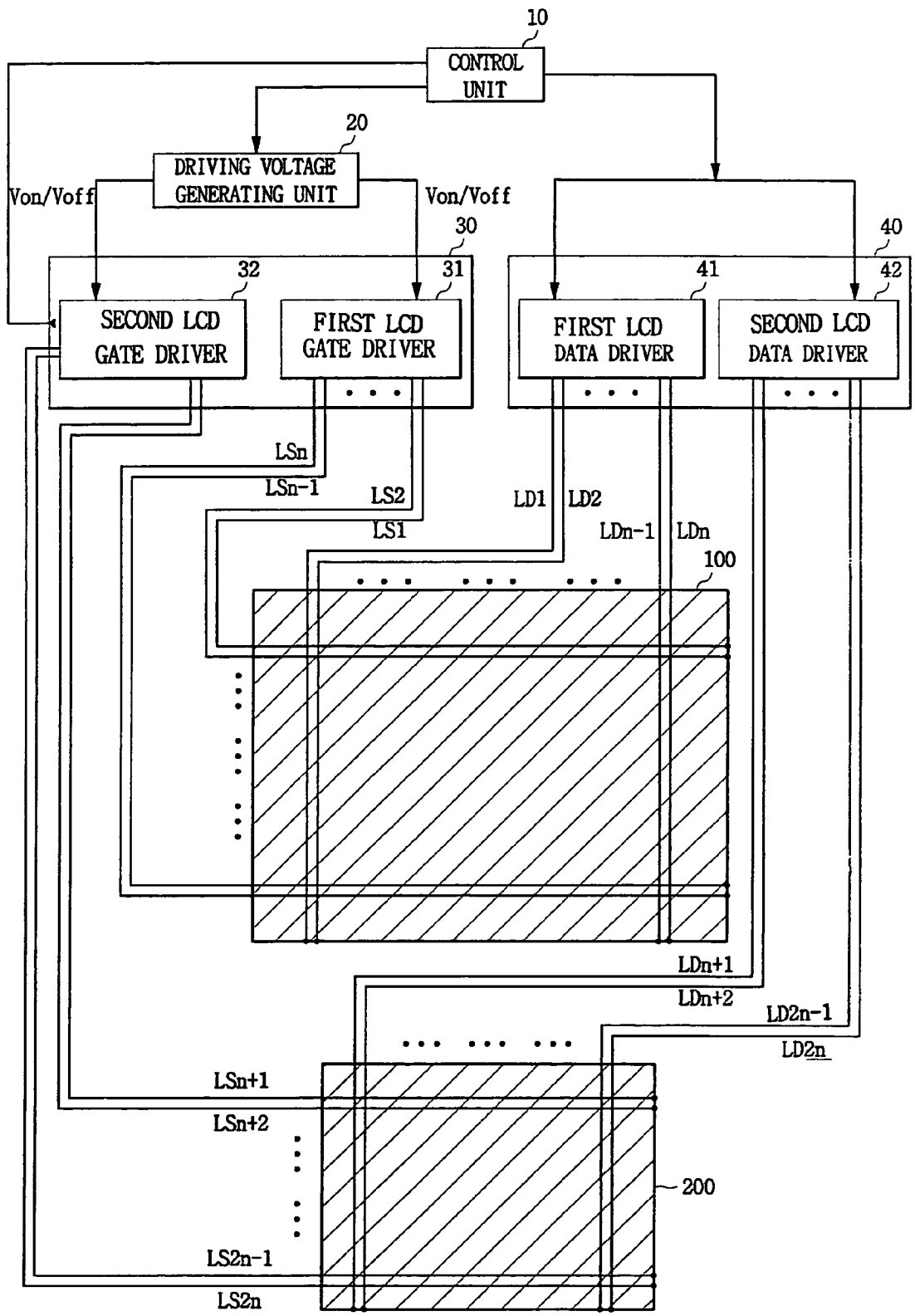
FIG. 2 is a plan view illustrating a wiring status of the conventional dual type LCD display device of FIG. 1.

Thus, assuming the number of the scan lines of the first LCD panel 100 is n, and the number of the scan lines of the second LCD panel 200 is also n, the total number of the wirings required to implement the dual type flat panel display device in the conventional case illustrated in FIG. 2 is 2n. But in this embodiment of the present invention, the number of necessary wirings is only n. As a result, the number of the wirings is reduced.

Accordingly, in this embodiment of the present invention, when a gate driving voltage from an LCD gate driver 30 is applied to the $n^{th}$ scan line LSn, driving signals are simultaneously applied to the n-th scan line of the first LCD panel 100 and to the $n^{th}$ scan line of the second LCD panel 200.

Therefore, when a data signal from an LCD data driver 40 is inputted, the first LCD panel 100 and the second LCD panel 200 are simultaneously provided driving signals.

However, it is required in the dual type flat panel display device that when the first LCD panel 100 is driven, the second LCD panel 200 is not driven. Similarly, it is required that when the second LCD panel 200 is driven, the first LCD panel 100 is not driven.

While in the first LCD panel 100 and the second LCD panel 200 of the conventional art, different wirings are provided and are selectively applied with a signal from the control unit 10 so that the panels are selectively driven, this embodiment of the present invention comprises the on/off switching devices 50, including S11, S12, . . . , S1n and S21, S22, . . . ,S2n, corresponding to respective gate signal inputs, enabling the switching devices S11 to S1n of the switching devices 50 to be in an ON state, while the switching devices S21 to S2n positioned at the inputs of the second LCD panel 200 to be in an OFF state, upon driving the first LCD panel 100.

Similarly, in order to drive the second LCD panel 200, the switching devices S21 to S2n of the switching devices 50, positioned at the inputs of the second LCD panel 200, are switched to be in an ON state, and the switching devices S11 to S1n of the switching devices 50, positioned at the inputs of the first LCD panel 100, are switched to be in an OFF state.

By doing so, it is possible to selectively drive the first LCD panel 100 or the second LCD panel 200 without increasing the number of the wirings for the scan lines.

It is preferable, though not necessary, that the on/off switching devices 50 are formed of thin film transistors in which N or P type thin film transistors may be used for the thin film transistors.

To directly drive the on/off switching devices 50, an on/off switching device control unit 60 may be further included. The on/off switching device control unit 60 can apply an electric signal to the on/off switching devices 50 to control an on/off state thereof.

The on/off switching device control unit 60 can simultaneously control the on/off switching devices 50 in the first LCD panel 100 or the second LCD panel 200 with only one signal.

Further, in this embodiment, the first LCD panel 100 and the second LCD panel 200 do not have to separately include the first and second LCD gate drivers 31 and 32 and the first and second LCD data drivers 41 and 42 to generate and apply a gate signal and a data signal, respectively. One LCD gate driver 30 and one LCD data driver 40 can selectively drive the first LCD panel 100 and the second LCD panel 200 without the separate first and second gate and data drivers 31, 32, 41, and 42, thereby reducing the number of the drivers as compared to the conventional art.

Although the wirings of the scan lines have been described by way of example in the present embodiment, the present invention can be also applied to the data lines. In the configuration according to that embodiment of the present invention, the scan lines should be formed individually for each of the first LCD panel 100 and the second LCD panel 200.

Meanwhile, one or more switching devices, such as thin film transistors, are included per an area (pixel area) surrounded by the scan lines LS1, LS2, . . . , LSn and the data lines LD1, LD2, . . . ,LDn−1, LDn and LDn+1, LDn+2, . . . , LD2n−1, LD2n.

The thin film transistors maintain an on/off state according to gate driving voltages applied to gate electrodes G of the thin film transistors via the scan lines. Further, data signals (image signals) are received via the data lines and source electrodes S of the thin film transistors from the LCD data driver 40, and are delivered to pixel electrodes via drain electrodes D of the thin film transistors, thereby generating light in the flat panel display devices in the pixel areas.

At this time, it is preferable, though not necessary, that the thin film transistors be P or N type thin film transistors.

As stated above, in an embodiment of the present invention, the number of the wirings is reduced as compared to the conventional art even while implementing the dual type flat panel display device. Further, the number of the drivers is reduced, thereby saving manufacturing cost, and a dead space is reduced, thereby more compactly manufacturing the display device.

Figure 4:
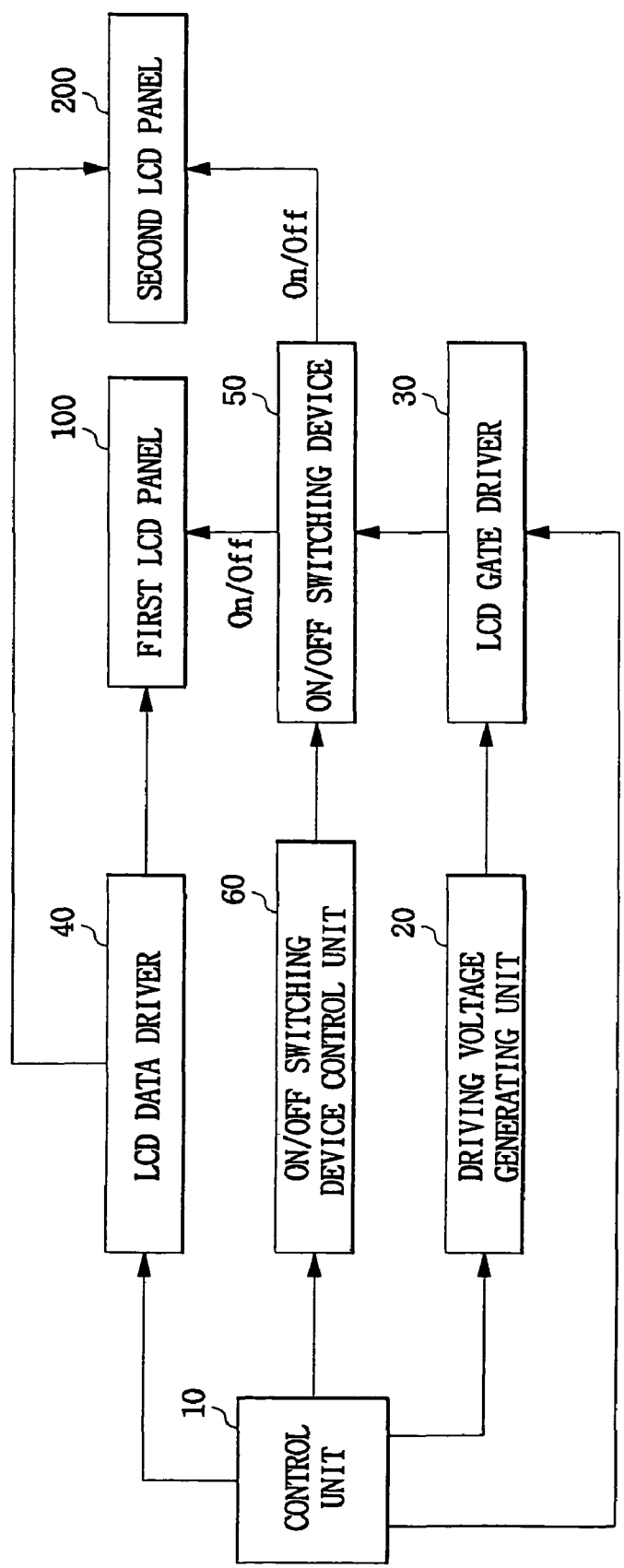
FIG. 4 is a block diagram of a configuration driving a dual type LCD panel according to an embodiment of the present invention.

FIG. 4 is a block diagram of a configuration for driving a dual type LCD panel according to an embodiment of the present invention.

Referring to FIG. 4, a flat panel display device of the present invention includes a control unit 10, a driving voltage generating unit 20, an LCD gate driver 30, an LCD data driver 40, on/off switching devices 50, and a first LCD panel 100 and a second LCD panel 200.

The control unit 10 outputs to the driving voltage generating unit 20 a signal defining the period and amplitude of a common voltage applied to the first and second LCD panels 100 and 200, outputs a data driver driving signal to the LCD data driver 40, and outputs a gate driver driving signal to the LCD gate driver 30 according to a vertical synchronization signal, a horizontal synchronization signal, and a main clock signal applied from outside the control unit.

The data driver 40 outputs a data driving voltage to respective data lines of the first LCD panel 100 and the second LCD panel 200 in response to the data driver driving signal.

The driving voltage generating unit 20 receives a signal defining the period and amplitude of a common electrode voltage Vcom from the control unit to adjust a voltage level of the signal up or down, and outputs a gate driving voltage Von or Voff to the LCD gate driver 30.

The gate driver 30 outputs a gate driving voltage to the LCD panels 100 and 200, based on the gate driver driving signal provided from the control unit 10 and the gate driving voltage Von or Voff provided from the driving voltage generating unit 20.

At this time, in an embodiment of the present invention, the on/off switching devices 50 are connected to either the scan line inputs or the data line inputs, and are correspondingly connected to the scan lines or the data lines, respectively. When an electrical signal is received from the on/off switching device control unit 60 to drive the first LCD panel 100, the switching devices 50 connected to the first LCD panel 100 are place in an ON state, and the switching devices 50 connected to the second LCD panel 200 are placed in an OFF state, so that a driving voltage signal outputted from the LCD gate driver 30 to the LCD panels 100 and 200 is applied only to the first LCD panel 100, thereby driving only the first LCD panel 100.

Similarly, to drive the second LCD panel 200, an electric signal is received from the on/off switching device control unit 60 so that the switching devices 50 connected to the first LCD panel 100 maintain an OFF state, and the switching devices 50 connected to the second LCD panel 200 maintain an ON state, thereby driving only the second LCD flat panel display device panel 200.

Meanwhile, the first and second LCD panels 100 and 200 comprise a plurality of scan lines, a plurality of data lines, and a plurality of common electrode lines, thin film transistors connected to respective scan lines and data lines, liquid crystal capacitors, and storage capacitors. Accordingly, the first and second LCD panels 100 and 200 will display a data voltage (or an image signal) provided from the LCD data driver 40 in response to a gate voltage (or a scan signal) provided from the LCD gate driver 30 and a common electrode voltage provided from the driving voltage generating unit 20.

Meanwhile, as stated previously, it is preferable, though not necessary, that the $1^{st}$ through $n^{th}$ scan or data line of the first LCD panel 100 and the $1^{st}$ through $n^{th}$ scan or data line of the second LCD panel 200 are interconnected by one wiring.

By doing so, the first LCD panel 100 and the second LCD panel 200 do not have to separately include the first and second LCD gate drivers 31 and 32 and the first and second LCD data drivers 41 and 42 to drive a scan signal (gate driving signal) and a data signal (image signal), respectively, and the number of the wirings is also reduced. The first flat panel display device panel 100 and the second LCD panel 200 can be selectively driven only with one LCD gate driver 30 and one LCD data driver 40.

Meanwhile, it is preferable, though not necessary, that N or P type thin film transistors are used for the on/off switching devices 50.

Meanwhile, a dual type flat panel display device of the present invention can be applied to all flat panel display devices, and can be used for an organic electroluminescent element or a liquid crystal display device, in which the liquid crystal display device may include a super twisted nematic liquid crystal display device, a TFT liquid crystal display device, a field sequential liquid crystal display device, or the like.

As described above, in the case of the present invention, the number of the wirings is reduced as compared to the conventional art when implementing a dual type flat panel display device. Further, the manufacturing cost is lowered as the number of the driving drivers is reduced, and a display device can be manufactured more compactly as the dead space is reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A dual type flat panel display device comprising:
a first flat panel display device panel; and
a second flat panel display device panel;
wherein the first and second flat panel display device panels each comprises:
a pixel area comprising:
a plurality of scan lines arranged in a first direction,
a plurality of data lines arranged in a second direction perpendicular to the first direction, and
pixel electrodes disposed in an area formed by the plurality of data lines and the plurality of scan lines crossing the data lines; and
a plurality of pixel transistors;
a non-pixel area comprising:
a plurality of on/off switching devices at inputs of the scan lines or the data lines, the plurality of on/off switching devices disposed between the inputs of the scan lines or the data lines on the pixel electrodes and n common wiring lines output from one gate driver or one data driver, respectively, wherein the common wiring lines are connected to source electrodes of the on/off switching devices and drain electrodes of the on/off switching devices are directly connected to gate electrodes or source electrodes of 2n pixel transistors, and
the on/off switching devices are respectively connected to the plurality of scan lines or the plurality of data lines, and
an $n^{th}$ scan line of the first flat panel display device panel is connected with an $n^{th}$ scan line of the second flat panel display device panel by an $n^{th}$ common wiring line via a respective one of the plurality of on/off switching devices, where n is a natural number, and is at least the same or the larger of the number of the scan lines of the first flat panel display device panel and the number of the scan lines of the second flat panel display device panel,
wherein distances of the common wiring lines between the gate driver or data driver and the source electrodes of the on/off switching devices is greater than distances of the common wiring lines between the drain electrode of the on/off switching devices and the gate or source electrodes of the pixel transistors.

2. The device according to claim 1, wherein the on/off switching devices are thin film transistors.

3. The device according to claim 2, wherein the thin film transistors are N type or P type thin film transistors.

4. The device according to claim 1, wherein an $n^{th}$ data line of the first flat panel display device panel is connected with the $n^{th}$ data line of the second flat panel display device panel by another common wiring, wherein n is a natural number.

5. The device according to claim 4, wherein the on/off switching devices are thin film transistors.

6. The device according to claim 5, wherein the thin film transistors are N type or P type thin film transistors.

7. The device according to claim 1, further comprising an on/off switching device control unit to directly drive the on/off switching devices.

8. The device according to claim 7, wherein the on/off switching device control unit controls an $n^{th}$ on/off switching device of the second flat panel display device panel to be in an OFF state in response to an $n^{th}$ on/off switching device of the first flat panel display device panel being in an ON state.

9. The device according to claim 8, wherein the on/off switching device control unit simultaneously controls the on/off switching devices of the first flat panel display device panel and the second flat panel display device panel with only one electrical signal.

10. The device according to claim 7, wherein the on/off switching device control unit controls an $n^{th}$ on/off switching device of the first flat panel display device panel to be in an OFF state in response to an $n^{th}$ on/off switching device of the second flat panel display device panel being in an ON state.

11. The device according to claim 1, wherein the one gate driver and the one data driver simultaneously control the first flat panel display device panel and the second flat panel display device panel.

12. The device according to claim 11, wherein the one gate driver and the one data driver are directly connected to all of the plurality of scan lines and the plurality of data lines, respectively.

13. The device according to claim 1, wherein the pixel area includes at least one switching member.

14. The device according to claim 13, wherein the switching member is any one of P type and N type thin film transistors.

15. The device according to claim 1, wherein when the number of the scan lines is n, and the number of the data lines is 2n.

16. The device according to claim 1, wherein the number of the data lines is n, and the number of the scan lines is 2n.

17. The device according to claim 1, wherein the dual type flat panel display device is disposed in one of a super twisted nematic liquid crystal display device, a TFT liquid crystal display device, and a field sequential liquid crystal display device.

18. The device according to claim 1, wherein a number of the on/off switching devices for the first flat panel display device panel and a number of the on/off switching devices for the second flat panel display device panel are equal.

19. The device according to claim 1, where n is the larger of the number of the scan lines of the first flat panel display device panel and the number of the scan lines of the second flat panel display device panel.

20. A dual type flat panel display device comprising:
first and second flat panel display device panels each comprising:
a plurality of scan lines,
a plurality of data lines,
a plurality of pixel electrodes, and
a plurality of pixel transistors;
a gate driver to output a gate driving signal and a gate driving voltage to the plurality of scan lines;
a data driver to output a driving voltage to the plurality of data lines according to a received data driver driving signal;
a control unit to generate the data driver driving signal and the gate driving signal;
a driving voltage generating unit to receive the gate driving signal from the control unit and output the gate driving voltage to the gate driver; and
on/off switching devices respectively connected to either the plurality of scan lines or the plurality of data lines, the plurality of on/off switching devices disposed between the inputs of the scan lines or the data lines on the pixel electrodes and n common wiring lines output from the gate driver or the data driver, respectively, wherein the common wiring lines are connected to source electrodes of the on/off switching devices and drain electrodes of the on/off switching devices are directly connected to the gate electrodes or the source electrodes of 2n pixel transistors, wherein an $n^{th}$ scan line of the first flat panel display device panel is connected with an $n^{th}$ scan line of the second flat panel display device panel by an $n^{th}$ common wiring line via a respective one of the plurality of on/off switching devices, where n is a natural number, and is at least the same or the larger of the number of the scan lines of the first flat panel display device panel and the number of the scan lines of the second flat panel display device panel, and wherein distances of the common wiring lines between the gate driver or data driver and the source electrodes of the on/off switching devices is greater than distances of the common wiring lines between the drain electrode of the on/off switching devices and the gate or source electrode of the pixel transistors.

21. The device according to claim 20, wherein the on/off switching devices selectively turn on/off the scan lines or the data lines.

22. The device according to claim 20, further comprising an on/off switching device control unit to receive a signal from the control unit to control the on/off switching devices so that the scan lines or the data lines are selectively turned on/off.

23. The device according to claim 20, wherein the on/off switching devices simultaneously control the scan lines or the data lines of the second flat panel display device panel to be in an OFF state in response to controlling the scan lines or the data lines of the first flat panel display device to be in an ON state.

24. The device according to claim 23, wherein an $n^{th}$ data line of the first flat panel display device panel is connected with an $n^{th}$ data line of the second flat panel display device panel by another common wiring line.

25. The device according to claim 23, wherein the on/off switching devices simultaneously control the scan lines or the data lines of the second flat panel display device panel to be in an ON state in response to controlling the scan lines or the data lines of the first flat panel display device to be in an OFF state.

26. The device according to claim 20, wherein the on/off switching devices are thin film transistors.

27. The device according to claim 26, wherein the thin film transistors are N type or P type thin film transistors.

28. The device according to claim 20, wherein the dual type flat panel display device is disposed in one of a super twisted nematic liquid crystal display device, a TFT flat panel display device, and a field sequential liquid crystal display device.

29. A dual type flat panel display device comprising: first and second flat panel display device panels each comprising:
a plurality of scan lines,
a plurality of data lines, and
a plurality of pixel transistors; and
a plurality of on/off switching devices at inputs of the scan lines or the data lines, the plurality of on/off switching devices disposed between inputs of the scan lines or the data lines on pixel electrodes and n common wiring lines output from one gate driver or one data driver, respectively, wherein the common wiring lines are connected to source electrodes of the on/off switching devices and drain electrodes of the on/off switching devices are directly connected to gate electrodes or source electrodes of 2n pixel transistors;

wherein the on/off switching devices are respectively connected to the plurality of scan lines or the plurality of data lines, and an $n^{th}$ scan line of the first flat panel display device panel is connected with an nth scan line of the second flat panel display device panel by an $n^{th}$ common wiring line via a respective one of the plurality of on/off switching devices, where n is a natural number, and is at least the same or the larger of the number of the scan lines of the first flat panel display device panel and the number of the scan lines of the second flat panel display device panel, and wherein distances of the common wiring lines between the gate driver or data driver and source electrodes of the on/off switching devices is greater than distances of the common wiring lines between drain electrode of the on/off switching devices and gate or source electrodes of the pixel transistors.

30. The device of claim 29, wherein an $n^{th}$ data line of the first flat panel display device panel is connected with an $n^{th}$ data line of the second flat panel display device panel by another common wiring line.

31. A dual type flat panel display device comprising:
a first flat panel display device panel having a first plurality of signal lines and a first plurality of pixel transistors;
a second flat panel display device panel having a second plurality of signal lines respectively connected to the first signal lines to receive common signals, and a second plurality of pixel transistors; and
on/off switching devices respectively connected to either a plurality of scan lines or a plurality of data lines, the plurality of on/off switching devices disposed between inputs of the scan lines or the data lines on pixel electrodes and n common wiring lines output from a gate driver or a data driver, respectively, wherein the common wiring lines are connected to source electrodes of the on/off switching devices and drain electrodes of the on/off switching devices are directly connected to gate electrodes or source electrodes of 2n pixel transistors, wherein on/off states of the first and second pluralities of signal lines are switched so as to be opposite to one another, and an $n^{th}$ scan line of the first flat panel display device panel is connected with an $n^{th}$ scan line of the second flat panel display device panel by an $n^{th}$ common wiring line via a respective one of the plurality of on/off switching devices, where n is a natural number, and is at least the same or the larger of the number of the scan lines of the first flat panel display device panel and the number of the scan lines of the second flat panel display device panel, and wherein distances of the common wiring lines between the gate driver or data driver and the source electrodes of the on/off switching devices is greater than distances of the common wiring lines between the drain electrode of the on/off switching devices and the gate or source electrode of the pixel transistors.

32. The device according to claim 31, further comprising on/off switching control unit to control the on/off switching devices.

33. A dual type flat panel display device comprising:
first and second flat panel display device panels, both having a plurality of pixel transistors;
a driver to supply identical signals to the first and second flat panel display device panels; and
switching devices to allow only one of the first and second flat panel display device panels to receive the signals from the driver at any given time, the switching devices disposed between the first and second flat panel display devices and n common wiring lines output from the driver, wherein the common wiring lines are connected to source electrodes of the switching devices and drain electrodes of the switching devices are directly connected to gate electrodes or source electrodes of 2n pixel transistors, wherein an $n^{th}$ scan line of the first flat panel display device panel is connected with an $n^{th}$ scan line of the second flat panel display device panel by an $n^{th}$ common wiring line via a respective one of the plurality of on/off switching devices, where n is a natural number, and is at least the same or the larger of the number of the scan lines of the first flat panel display device panel and the number of the scan lines of the second flat panel display device panel, and wherein distances of the common wiring lines between the gate driver or data driver and the source electrodes of the on/off switching devices is greater than distances of the common wiring lines between the drain electrode of the on/off switching devices and the gate or source electrode of the pixel transistors.

34. The device of claim 33, further comprising a switching control unit to control the switching devices.

35. A dual type flat panel display device comprising:

first and second flat panel display device panels, both having a plurality of pixel transistors;

a gate driver to drive both the first and second flat panel display device panels;

a data driver to drive both the first and second flat panel display device panels; and on/off switching devices respectively connected to either a plurality of scan lines or a plurality of data lines, the plurality of on/off switching devices disposed between panel inputs of n common wiring lines output from the gate driver or the data driver, respectively, wherein the common wiring lines are connected to source electrodes of the on/off switching devices and drain electrodes of the on/off switching devices are directly connected to gate electrodes or source electrodes of the 2n pixel transistors, wherein the gate driver or the data driver supplies identical respective signals to the first and second flat panel display device panels through the common wiring lines, and the signals are switched so that only one of the first and second flat panel display device panels receives the signals at any given time, and an $n^{th}$ scan line of the first flat panel display device panel is connected with an $n^{th}$ scan line of the second flat panel display device panel by an $n^{th}$ common wiring line via a respective one of the plurality of on/off switching devices, where n is a natural number, and is at least the same or the larger of the number of the scan lines of the first flat panel display device panel and the number of the scan lines of the second flat panel display device panel, and wherein distances of the common wiring lines between the gate driver or data driver and the source electrodes of the on/off switching devices is greater than distances of the common wiring lines between the drain electrode of the on/off switching devices and the gate or source electrode of the pixel transistors.

* * * * *